United States Patent
Singh et al.

(10) Patent No.: US 12,534,780 B2
(45) Date of Patent: *Jan. 27, 2026

(54) MACRO-CHIP REINFORCED ALLOY

(71) Applicant: TECNIUM, LLC, Margate City, NJ (US)

(72) Inventors: Krishna P. Singh, Jupiter, FL (US); Thomas G. Haynes, III, Tampa, FL (US); Luke Chester Sobus, Doylestown, OH (US)

(73) Assignee: TECNIUM, LLC

( * ) Notice: Subject to any disclaimer, the term of this patent is extended or adjusted under 35 U.S.C. 154(b) by 153 days.

This patent is subject to a terminal disclaimer.

(21) Appl. No.: 18/108,728

(22) Filed: Feb. 13, 2023

(65) Prior Publication Data

US 2023/0193428 A1    Jun. 22, 2023

Related U.S. Application Data

(60) Continuation of application No. 17/084,573, filed on Oct. 29, 2020, now Pat. No. 11,590,573, which is a
(Continued)

(51) Int. Cl.
| | |
|---|---|
| *C22C 21/00* | (2006.01) |
| *B22F 1/05* | (2022.01) |
| *B22F 3/10* | (2006.01) |
| *B22F 7/00* | (2006.01) |
| *C22C 1/10* | (2023.01) |
| *C22C 32/00* | (2006.01) |
| *G21F 1/04* | (2006.01) |

(52) U.S. Cl.
CPC ............... *C22C 21/00* (2013.01); *B22F 1/05* (2022.01); *B22F 3/10* (2013.01); *B22F 7/008* (2013.01); *C22C 1/1084* (2013.01); *C22C 32/0057* (2013.01); *G21F 1/047* (2013.01); *B22F 2998/10* (2013.01); *B22F 2999/00* (2013.01)

(58) Field of Classification Search
None
See application file for complete search history.

(56) References Cited

U.S. PATENT DOCUMENTS

| | | |
|---|---|---|
| 5,506,061 A | 4/1996 | Kindl et al. |
| 5,638,886 A | 6/1997 | Aghajanian et al. |
| (Continued) | | |

FOREIGN PATENT DOCUMENTS

| | | | |
|---|---|---|---|
| WO | WO 90/02824 | 3/1990 | |
| WO | WO-9002824 A1 * | 3/1990 | ............ C22C 49/04 |

OTHER PUBLICATIONS

Corresponding International Search Report and Written Opinion for PCT/US16/20976 dated Jun. 2, 2016.
(Continued)

*Primary Examiner* — Colin W. Slifka
(74) *Attorney, Agent, or Firm* — The Belles Group, P.C.

(57) ABSTRACT

Described herein are methods of forming a neutron shielding material. Such material may comprise a powder blend comprising a first component comprising a blend of a first metal particle and a first ceramic particle; and a second component comprising a reinforcing chip, the reinforcing chip comprising a second ceramic particle dispersed within a chip metal matrix.

20 Claims, 1 Drawing Sheet

Related U.S. Application Data division of application No. 15/061,542, filed on Mar. 4, 2016, now Pat. No. 10,843,272.

(60) Provisional application No. 62/128,455, filed on Mar. 4, 2015.

(56) References Cited

U.S. PATENT DOCUMENTS

| | | |
|---|---|---|
| 5,965,829 A | 10/1999 | Haynes, III et al. |
| 6,562,098 B1 | 5/2003 | Fujisuka et al. |
| 10,843,272 B2 | 11/2020 | Singh et al. |
| 2007/0227299 A1 | 10/2007 | Marchiando et al. |
| 2010/0028193 A1 | 2/2010 | Haynes, III et al. |
| 2010/0206639 A1 | 8/2010 | Lockwood |
| 2011/0293461 A1 | 12/2011 | Duz et al. |
| 2021/0053124 A1 | 2/2021 | Singh et al. |

OTHER PUBLICATIONS

Buyuk et al. "Gamma and Neutron attenuation behaviors of boron carbide-silicon-carbide composites" Annals of Nuclear Energy, vol. 71 (Sep. 2014): pp. 46-51.

Buyuk et al. "Investigation on the Effects of Boron Carbide Particle Size on Radiation Shielding Properties of Boron-Carbide Titanium Diboride Composites" Acta Physica Polonica, vol. 123 Issue 2 (2013): pp. 177-179.

* cited by examiner

MACRO-CHIP REINFORCED ALLOY

CROSS-REFERENCE TO RELATED APPLICATIONS

This application is a continuation application of U.S. patent application Ser. No. 17/084,573, filed on Oct. 29, 2020 (now U.S. Pat. No. 11,590,573), which is a divisional of U.S. patent application Ser. No. 15/061,542, filed on Mar. 4, 2016 (now U.S. Pat. No. 10,843,272), which claims the benefit of U.S. Provisional Application No. 62/128,455, filed on Mar. 4, 2015. The disclosures of the above applications are incorporated herein by reference in their entireties.

BACKGROUND

Composite materials comprising a metal matrix and alloying elements, such as ceramic particles, have long been used for a variety of applications, such as shielding neutron radiation in connection with nuclear reactors. However, adding a greater diversity of metal matrix materials with different types and amounts of alloying elements have creates difficulties with respect to forming grain structures that are suitable for extreme applications (i.e., high temperature, high load-bearing, etc.). Thus, while certain materials may be known to individually provide added performance benefits, there still remains a need for composites materials (and methods of their production) that can successfully incorporate such alloying and matrix materials without undermining the overall structural integrity required for the final application of the composite.

BRIEF SUMMARY

The present invention is directed to a method of forming a neutron shielding material comprising a) mixing together a first metal particle having a first grain growth temperature; a first ceramic particle; and a reinforcing chip to form a powder blend; and b) processing the powder blend at a hot-work temperature; wherein the reinforcing chip comprises a second ceramic particle dispersed within a chip metal matrix having a second grain growth temperature; and wherein the hot-work temperature is lower than both of the first and second grain growth temperatures. In certain embodiments, the hot-work temperature is less than about 1100° F. In certain embodiments, the reinforcing chip is present in a non-zero amount ranging up to about 35 wt. % based on the total weight of the powder blend. In certain embodiments, the processing of step b) comprises vacuum sintering the powder blend into a billet and subsequently extruding the billet into a sheet material. In certain embodiments, the first metal particle comprises aluminum. In certain embodiments, the aluminum is aluminum powder. In certain embodiments, the aluminum powder has D100 that is less than about 30 μm. In certain embodiments, the aluminum powder has D50 between about 1 μm and about 20 μm. In certain embodiments, the first ceramic particle comprises boron carbide. In certain embodiments, the boron carbide is boron carbide powder. In certain embodiments, the boron carbide powder has a particle size distribution of 100% less than about 250 μm. In certain embodiments, the second ceramic particle comprises boron carbide. In certain embodiments, the boron carbide is boron carbide powder. In certain embodiments, the boron carbide powder has a particle size distribution of 100% less than about 250 μm. In certain embodiments, the metal matrix comprises aluminum powder. In certain embodiments, the aluminum powder has D100 that is less than about 30 μm. In certain embodiments, the aluminum powder has D50 between about 1 μm and about 20 μm.

In certain embodiments, the reinforcing chip is formed by mixing the second ceramic particle and metal; forming a billet from the mixture; extruding the billet; and machining the mold. In certain embodiments, the extrusion is performed at a temperature lower than the grain growth temperature of the metal. In certain embodiments, the metal is aluminum powder and the second ceramic particle is boron carbide powder.

Other embodiments of the present invention include a method of forming a neutron shielding material comprising: mixing together a first aluminum particle; a first ceramic particle; and a reinforcing chip to form a powder blend, the reinforcing chip having a grain growth temperature and comprising a second ceramic particle dispersed within an aluminum matrix; and processing the powder blend at an elevated temperature that is lower than the grain growth temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1A:
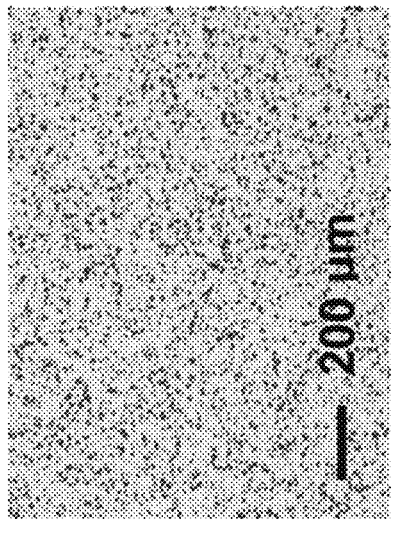
FIG. 1(a) is an SEM photomicrograph of a left side of an extruded macro-chip reinforced alloy according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

The present invention is directed to a macro-chip reinforced alloy (referred to herein as "reinforced alloy"). The reinforced alloy may be formed by processing a powder blend that comprises a first component and a second component. The first component comprises a blend of a first metal particle and a first ceramic particle. The second component comprises a reinforcing macro-chip (also referred to "reinforcing chip").

The second component and first component may be present in a weight ratio ranging from about 1:100 to about 1:2—including all ratios and sub-ranges there-between. The first component may be present in an amount ranging from about 65 wt. % to less than 100 wt. % based on the total weight of the powder blend—including all values and sub-ranges there-between. The second component may be present in a non-zero amount ranging up to about 35 wt. % based on the total weight of the powder blend—including all values and sub-ranges there-between. In a preferred embodiment, the second component is present in an amount ranging from about 1 wt. % to about 30 wt. % based on the total weight of the powder blend—including all values and sub-ranges there-between.

The first component comprises a blend of the first metal particle and the first ceramic particle. The first ceramic particle and the first metal particle may be present in a weight ratio ranging from about 1:15 to about 1:7—including all ratios and sub-ranges there-between. In some embodiments, the first component may further comprise nano-particles of aluminum oxide.

The first metal particle may be present in an amount ranging from about 80 wt. % to about 99 wt. % based on the total weight of the first component—including all values and sub-ranges there-between. The first ceramic particle may be present in an amount ranging from about 1 wt. % to about 20 wt. % based on the total weight of the first component—including all values and sub-ranges there-between. In a preferred embodiment, the first ceramic particle is present in an amount ranging from about 5 wt. % to about 10 wt. % based on the total weight of the first component and the first metal particle is present in an amount ranging from about 90 wt. % to about 95 wt. % based on the total weight of the first component—including all values and sub-ranges there-between.

The first metal particle may be characterized by particle size distribution ("D"). As used herein, the particle size distribution in reference to cumulative volume traction (%)—such as D50—refers to the particle size value at which the cumulative volume of particles reaches 50%. Stated otherwise, the term "D50" indicates that 50% of the alloy particles have a particle size less than or equal to the assigned value or range—e.g., from 20 μm (micron) to about 25 μm. This particle size distribution may be measured by a Microtrac Analyzer (laser-based technology) or equivalent sedigraph (i.e., particle size analyzer).

The first metal particle may have a D10 ranging between 6 μm and about 10 μm. The first metal particle may have a D50 of about 20 μm. The first metal particle may have a D90 of about 38 μm. In a preferred embodiment, the metal particle may have D10, D50 and D90 values of about 4 μm, 12 μm and 25 μm, respectively, and even more preferably, the values are 2 μm, 9 Am and 17 μm, respectively. It is to be understood that the above stated values are independent of one another. Thus, a particle size distribution within the scope of the invention includes, for example, particles having a D10 of 4 μm, a D50 of 20 μm and a D90 of 17 μm.

The first metal particle has a microstructure having a first grain growth temperature. The first metal particle has a microstructure having a first grain size. According to the present invention, grain size is a measure of basic microstructural unit size where each unit possesses a significantly different crystallographic orientation and/or basic microstructure as compared to neighboring units. Thus, grain size, as used herein, refers to the average grain size of a metal which can be measured by one of several techniques known to those skilled in the art of metallurgy. One such technique is described in ASTM E 1382. Generally, the strength of the final macro-chip reinforced alloy can be increased by reducing the grain size of the first metal particle.

The first metal particle may be a steel particle, an aluminum particle, a nickel alloy based particle, or a titanium alloy based particle. In a preferred embodiment, the first metal particle is an aluminum particle that may be selected from pure aluminum or an aluminum alloy.

Suitable aluminum alloy may be selected from the 1000, 2000, 3000, 4000, 5000, 6000, or 7000 series of aluminum alloy. Each specific series of aluminum alloy contains various amounts of other elements ("alloying element") as set forth by the following table:

| Series | Alloy | Substance |
|---|---|---|
| 1000 | Aluminum with purity >99% | Al |
| 2000 | Aluminum, Copper | Al + Cu |
| 3000 | Aluminum, Manganese | Al + Mn |
| 4000 | Aluminum, Silicon | Al + Si |
| 5000 | Aluminum, Magnesium | Al + Mg |
| 6000 | Aluminum, Magnesium, Silicon | Al + Mg, Si |
| 7000 | Aluminum, Zinc, Magnesium | Al + Zn + Mg |

The selection of specific aluminum alloy series used as the first metal particle will depend on the desired properties of the macro-chip reinforced alloy. The addition of some alloying elements, while improving certain material properties, may also negatively impact other material properties of the resulting alloy. Relevant properties include both based on the specific alloying element are set forth by the following table:

| Element | Description |
|---|---|
| Magnesium | Improves strain-hardening properties and corrosion resistance |
| Silicon | Improves strength of the alloy. Precipitation hardening is allowed when Silicon is used in combination with Magnesium |
| Zinc | Increases strength significantly and allows precipitation hardening, but may make the alloy susceptible to stress corrosion |
| Copper | Increases strength and allows precipitation hardening, but may reduce corrosion resistance, welding properties, and ductility |
| Manganese | Increases strength and can help govern the grain structure; will help prevent recrystallization of the metal particle |

-continued

| Element | Description |
|---|---|
| Nickel | Improves strength at high temperatures |
| Titanium | Leads to smaller grain size |
| Zirconium | Helps stabilize the alloy |
| Chromium | Increases resistance to stress corrosion of the alloy |
| Iron | Typically is present as an impurity, however, Iron can increase the strength of pure Aluminum if its proportion by weight is less than 1 wt. % based on the total weight of the aluminum powder. Iron may also have an undesirable effect on the corrosion resistance of aluminum alloys |

Non-limiting examples of a commercially pure aluminum particles (i.e. >99% Al) include the 1000 series aluminum, such as the 1100 series of aluminum. Non-limiting examples of copper containing aluminum alloy particles include the 2000 series, such as the 2014, 2024, and 2219 series. Non-limiting examples of manganese containing aluminum alloy particles include the 3000 series, such as the 3003, 3004, and 3102 series. Non-limiting examples of silicon containing aluminum alloy particles include the 4000 series, such as the 4041 series. Non-limiting examples of magnesium containing aluminum alloy particles include the 5000 series, such as the 5005, 5052, 5083, 5086, 5154, 5356, 5454, 5456, and 5754 series. Non-limiting examples of magnesium and silicon containing aluminum alloy particles include the 6000 series, such as the 6005, 6005A, 6060, 6061, 6063, 6066, 6070, 6082, 6105, 6162, 6262, 6351, and 6463 series. Non-limiting examples of zinc and magnesium containing aluminum alloy particles include the 7000 series, such as the 7005, 7022, 7050, 7068, 7072, 7068, 7072, 7075, 7079, 7085, 7116, 7129, and 7178 series.

These aluminum alloys are metallurgically well understood and are very widely used with a long history of good corrosion resistance and mechanical properties. When exposed to neutron radiation, very little long term radioactivity of the material is generated due to the alloys' chemical composition. This in turn is due to the fact that the primary elements in the alloy (e.g., Al, Si and Mg) all have relatively low cross-sections for neutrons and the isotopes formed from transmutation have short half-lives.

An oxide may exist on the surface of the aluminum particle. An indication of the oxide content can be estimated by measuring the oxygen content of the aluminum particle. Generally the oxygen content does not significantly change whether air, nitrogen, or argon gases are used to manufacture the powder. As aluminum particle surface area increases (aluminum particle size decreases) the oxygen content increases dramatically, indicating greater oxide content.

The thickness of the oxide coating on the aluminum particle may range from about 3 nm to about 7 nm and have an average of about 5 nm regardless of the type of atomization gas but is independent of alloy composition and particle size. The oxide is primarily alumina ($Al_2O_3$) with other unstable compounds such as Al (OH) and AlOOH. This alumina oxide content is primarily controlled by the specific surface area of the powder. Particle size and particle morphology are the two main parameters which influence the specific surface area of the powder (>the surface area) respectively the more irregular (>the surface area) the higher the oxide content.

With conventional aluminum powder sizes having a Particle Size Distribution (PSD) of <400 μm the particle shape/morphology becomes a very important factor towards controlling the oxide content since the irregular particle shape results in a greater surface area thus a higher oxide content. With a particle size <30 μm the effect of particle morphology has less influence on oxide content since the particles are more spherical or even ideal spherical in nature. Generally, the oxide content for various atomized aluminum particle sizes varies between about 0.01 wt. % to about 4.5 wt. % of alumina oxide based on the total weight of the aluminum particles—including all values and sub-ranges there-between. When using aluminum as the first metal particle, superior properties can result based on the tremendous reduction in grain size and the uniform distribution of the nano-scale alumina oxide in the ultra-fine grained aluminum matrix.

The first ceramic particle is present in the first component of the powder blend as a separate and distinct particle from the first metal particle in the first component of the powder blend. The first ceramic particle may have a particle distribution of 100% that is less than about 250 μm—preferably less than 200 μm. The first ceramic particle may have a D98 particle size of about 40 μm. In a preferred embodiment, the first ceramic particle may have a D98 particle size of about 30 μm—preferably about 20 μm.

The first ceramic may be a particle selected from aluminum oxide, titanium carbide, titanium oxide, titanium diboride, silica, silicon carbide, tungsten carbide, boron carbide, boron nitride, and mixtures thereof. The specific selection of the type of ceramic used as the first ceramic will depend on the desired properties of the macro-chip reinforced alloy.

The second component of the powder blend comprises a reinforcing macro-chip (also referred to "reinforcing chip"). The second component exists as a separate and distinct particle from the first metal particle and the first ceramic particle in the powder blend. The macro-chip comprises a second ceramic particle homogenously dispersed within a chip metal matrix.

The second ceramic particle may be present in an amount ranging from about 1 wt. % to about 30 wt. % based on the total weight of the second component—including all values and sub-ranges there-between. The chip metal matrix may be present in an amount ranging from about 70 wt. % to about 99 wt. % based on the total weight of the second component—including all values and sub-ranges there-between. The second ceramic particle and the chip metal matrix may be present in a weight ratio ranging from about 1:15 to about 1:7.

The reinforcing chip may be flat-shaped with a high aspect ratio—as discussed further herein. The reinforcing chip may have a length ranging from about 1.0 mm to about 9.0 mm—including all values and sub-ranges there-between. The reinforcing chip may have a width ranging from about 2.0 mm to about 10.0 mm—including all values and sub-ranges there-between. The reinforcing chip may have a thickness ranging from about 0.1 mm to about 1.0 mm—including all values and sub-ranges there-between.

The reinforcing chip may have a length to width aspect ratio ranging from about 1:3 to about 1:1.25—including all ratios and sub-ranges there-between. The reinforcing chip may have a length to thickness aspect ratio ranging from about 4:1 to about 14:1—including all ratios and sub-ranges there-between.

In a preferred embodiment, the reinforcing chip has the following characteristics.

| Property | Nominal Value |
| --- | --- |
| Average Length | 4.0-4.5 mm |
| Average Width | 5.5-5.6 mm |
| Average Thickness | 0.23-0.5 mm |
| Weight of 100 Chips | 2 grams |
| Packing Density | 0.7 g/cm$^3$ |

The reinforcing chip may be formed by hot-deforming (also referred to as hot-working) a second metal particle with the second ceramic particle to form the second component, whereby the second metal particle becomes the chip metal matrix. Regarding the specific type of material suitable for the second ceramic particle, one or more of the ceramic previously discussed with respect to the first ceramic particle may be selected for the second ceramic particle. Regarding the specific type of material suitable as the second metal particle, one or more of the metals previously discussed with respect to the first metal particle may be selected for the second metal particle. Thus, the chip metal matrix may be formed from one or more of the same materials listed with respect to the first metal particle.

The chip metal matrix may have a second grain growth temperature. The chip metal matrix has a microstructure having a second grain size.

According to the present invention, the specific metal selected for the first metal particle may be the same as the specific metal selected for chip metal matrix, thereby resulting in homogenous macro-chip reinforced alloy having a single phase. According to this embodiment, the first grain size of the first metal particle should be substantially equal to the second grain size of the second matrix metal. The first ceramic particle may be the same or different than the second ceramic particle.

According to other embodiments of the present invention, the specific metal selected for the first metal particle may be different than the specific metal selected for chip metal matrix, thereby resulting in a duplex macro-chip reinforced alloy having two phases (i.e., a first phase based on the first metal particle and a second phase based on the chip metal matrix). According to this embodiment, the first grain size of the first metal particle should be substantially equal to the second grain size of the second matrix metal. The first ceramic particle may be the same or different than the second ceramic particle.

Using the two-component powder blend according to the present invention provides a useful way to actively modify the composition of the resulting macro-chip reinforced alloy. Specifically, using a first component comprising a first ceramic particle and a first metal particle having a first grain size, as well as a second component comprising a second ceramic particle dispersed within a chip metal matrix having a second grain size—wherein the first and second grain sizes are substantially equal—allows for the resulting macro-chip reinforced alloy to exhibit desirable mechanical properties as there is not heterogeneous distribution of grain size throughout the alloy, while also provided for active modification of the relative amounts of metallic material (i.e., first metal particle vs. chip metal matrix) as well as relative amounts of ceramic material (i.e., first ceramic particle vs. second ceramic particle). The result is a dynamic approach to creating composite materials that can exhibit a combination of desirable mechanical properties (e.g., modulus, elongation) that are closely tailored to each component present in the alloy without worry that the presence of difference phases within the alloy will undermine the structural integrity of the resulting macro-chip reinforced alloy.

The first ceramic particle may be present in the first component in a first weight percentage based on the total weight of the first component and the second ceramic particle may be present in the second component in a second weight percentage based on the total weight of the second component. The first weight percentage may be equal to the second weight percentage. In other embodiments, the first weight percentage may be less than the second weight percentage. In other embodiments, the first weight percentage may be greater than the second weight percentage.

The first metal particle may be present in the first component in a third weight percentage based on the total weight of the first component and the chip metal matrix may be present in the second component in a fourth weight percentage based on the total weight of the second component. The third weight percentage may be equal to the fourth weight percentage. In other embodiments, the third weight percentage may be less than the fourth weight percentage. In other embodiments, the third weight percentage may be greater than the fourth weight percentage.

The amounts of the first metal particle and the chip metal matrix may sum to a total metal amount that ranges from about 70 wt. % to about 99 wt. % based on the total weight of powder blend. The amounts of the first ceramic particle and the second ceramic particle may sum to a total metal amount that ranges from about 1 wt. % to about 30 wt. % based on the total weight of powder blend.

The specific selection of material for the first metal particle, the chip metal matrix, the first ceramic particle, and the second ceramic particle will depend on the desired properties of the macro-chip reinforced alloy.

For example, the macro-chip reinforced alloy may be suitable as a neutron shield material in spent nuclear fuel storage. In such embodiments, at least one of the first metal particle and chip metal matrix comprises one of the previously discussed aluminum powders and at least one of the first ceramic particle and second ceramic particle comprises boron carbide.

The boron carbide that is suitable for neutron shielding applications preferably comprises nuclear grade boron carbide powder prepared according to ASTM C750-89 (Type 1). This boron carbide powder has the following composition:

| Constituent | Chemical Requirement wt. % |
| --- | --- |
| Total Boron | ≥76.5 |
| Total Boron + Carbon | ≥98.0 |
| B10 Isotope | 19.9 ± 0.3 |
| HNO3 Sol. Boron | ≤0.5 |
| Water Sol. Boron | ≤0.2 |
| Iron | ≤1.0 |
| Fluoride | ≤25 µg/g |
| Chloride | ≤75 µg/g |
| Calcium | ≤0.3 |

According to some embodiments of the present invention, a neutron-shielding macro-chip reinforced alloy may be formed from a powder blend comprising a first component that includes a first metal particle of aluminum and a first ceramic particle of boron carbide, and a second component that includes a macro-chip formed from particles of boron carbide dispersed within an aluminum matrix. The first metal particle of aluminum and the aluminum matrix may be formed from the same aluminum alloy. The first metal particle may have a D90 particle size of about 30 μm and the second component may have a length to thickness aspect ratio ranging from about 4:1 to about 14:1. The second component may be present in an amount ranging from a non-zero value up to about 30 wt. % based on the total weight of the powder blend.

Generally, the macro-chip reinforced alloy of the present invention may be formed by combining the first component with the second component and mixing the two components in an industrial mixer (to form the powder blend)—such as a double planetary mixer (e.g., a Ross type mixer). The first and second component may be mixed for a period of time sufficient to homogenously disperse the first metal particle, the first ceramic particle, and the second component throughout the powder blend.

The homogeneously mixed powder blend is then placed into a mold and formed into a billet (i.e., bar stock) by vacuum sintering. The billet may then be hot-worked by extrusion into a shaped form (e.g., a sheet, block, tube, etc.). The billet may be hot-worked at an elevated temperature that is lower than the first and second grain growth temperatures. The elevated temperature may range up to a maximum of about 1100° F. so long as it remains below the first and second grain growth temperatures.

According to the present invention, the second component may be formed from a powder blend comprising the second ceramic particle and the second metal particle, which was then molded and hot-worked into a shaped form. Portions of the shaped form may then be removed (e.g., scrap material being removed from bulk portions of the shaped form), whereby those portions can be machined by rotating cutting head into the macro-chips of the present invention having the desired shape. Non-limiting examples of cutting head include rotary tungsten carbide cutting heads.

Thus, according to the present invention, not only does the two-component powder blend provide a useful mechanism for creating a diverse array of composite materials having one or more phases of material, but it also provides a suitable way to recycle bulk material otherwise designated as scrap material because such scrap material can be machined into the macro-chips and be remixed with virgin first metal particles and first ceramic particles—so long as that scrap material abides by the grain size and grain growth temperature relationships previously discussed. Thus, the second component can replace up to 35 wt. % of virgin first component when creating the neutron shielding material of the present invention without any degradation to mechanical performance, and, in some cases, improvements in packing density.

EXAMPLES

A sample of the non-reinforced alloy was prepared according to the following methodology. A second metal powder of virgin aluminum powder and a second ceramic powder of boron carbide were mixed together to create a "non-reinforced blend." The aluminum powder has D100 that is less than about 30 μm and the aluminum powder comprises a D50 between about 1 μm and about 20 μm. The boron carbide particles having a particle size distribution of 100% less than about 250 μm. The amounts of the aluminum powder and boron carbide powder are specified in Table 2.

TABLE 1

|  | Total Powder Blend |
| --- | --- |
| Virgin Aluminum Powder | 89.3 wt. % |
| Boron Carbide | 10.7 wt. % |

The non-reinforced blend was then placed into a mold and formed into a non-reinforced billet (i.e., bar stock) by vacuum sintering. A mold weight of about 42.2 kg was measured after completely filling the mold with the non-reinforced blend. The non-reinforced billet was then extruded into a sheet of non-reinforced alloy (i.e., "non-reinforced sheet" or "NRS") at a temperature lower than the grain growth temperature of the aluminum powder thereby forming an alloy having the boron carbide dispersed within the aluminum matrix.

Example 2

A portion of the non-reinforced sheet prepared in Example 1 was machined using a rotating tungsten carbide cutting head to form a plurality of reinforcing macro-chips. The reinforcing macro-chips had the following characteristics set forth in Table 2.

TABLE 2

| Property | Nominal Value |
| --- | --- |
| Average Length | 4.1 mm |
| Width | 5.7 mm |
| Average Thickness | 0.22 mm |
| Weight of 100 Chips | 2.0 grams |

About 98 kilograms (kg) of the reinforcing macro-chips were then mixed with about 228.6 kg of a first component that included about 204.1 kg of a first metal powder of aluminum powder and 24.5 kg a first ceramic powder of boron carbide. The aluminum powder has D100 that is less than about 30 μm and the aluminum powder comprises a D50 between about 1 μm and about 20 μm. The boron carbide particles having a particle size distribution of 100% less than about 250 μm. The specific formulations set forth in Table 2.

TABLE 2

|  | Total Weight | Total Powder Blend |
| --- | --- | --- |
| Reinforcing Macro-Chip | 98 kg | 30 wt. % |
| Virgin Aluminum Powder | 204.1 kg | 62.5 wt. % |
| Boron Carbide | 24.5 kg | 7.5 wt. % |

The reinforcing macro-chips, first metal powder, and first ceramic powder were mixed in a Ross type mixer. The reinforced blend was then placed into a mold and formed into a reinforced billet (i.e., bar stock) by vacuum sintering. A mold weight of about 54 kg was measured after completely filling the mold with the non-reinforced blend. The reinforced billet was then extruded into a sheet of reinforced alloy (i.e., "reinforced sheet" or "RS") at a temperature lower than the grain growth temperature of the aluminum powder and the aluminum matrix.

Both the non-reinforced blend of Example 1 and the reinforced blend of Example 2 were placed into the same mold having the same volume. Thus, as demonstrated by the increase in mold weight in the reinforced blend as compared to the non-reinforced blend (as demonstrated by Table 3), adding the macro-chips creates a greater mold packing density.

TABLE 3

|  | Mold Weight |
| --- | --- |
| Non-Reinforced Blend | 42.2 kg |
| Reinforced Blend | 54.0 kg |

Thus adding the reinforcing macro-chips provides for an improvement in packing density when manufacturing the powder blend.

Example 3

The mechanical properties of both the RS and the NRS were measured and compared—as set forth in Table 4.

TABLE 4

|  | Average Tensile Strength (ksi) | Average Yield Strength (0.2%)(ksi) | Average Elongation (%) | Average Reduction of Area (%) | Median Charpy Impact (ft-lbs) | Median Lateral Expansion (mils) | Meidan Young's Modulus (msi) |
| --- | --- | --- | --- | --- | --- | --- | --- |
| RS | 33.624 | 25.273 | 16.82 | 38.4 | 6.52 | 10 | 11.8 |
| NRS | 33.496 | 25.531 | 17.77 | 37.3 | 4 | 10 | 11.8 |

Thus, as demonstrated by Table 4, the reinforced sheet and the non-reinforced sheet demonstrate almost identical mechanical properties. With this understanding, creating a powder blend that substitutes a portion of the first component for the reinforcing macro-chips allows for excess non-reinforced alloy to be reused (i.e., recycled) in the form of the second component without degrading the mechanical properties of the overall final alloy.

Example 4

A chemical analysis was performed of the reinforced sheet to measure the distribution of the boron carbide particles throughout the sheet material. The boron carbide content of the reinforced sheet is set forth in Table 5.

TABLE 5

| Reinforced Sheet - Boron Carbide Content | |
| --- | --- |
| Left | 10.68 wt. % |
| Center | 10.68 wt. % |
| Right | 10.68 wt. % |

Thus, as demonstrated by Table 5, adding the reinforcing macro-chip with the virgin aluminum powder and ceramic powder of the first component does not create a heterogeneous distribution of the ceramic particles within the final alloy.

Example 5

The microstructure of both the reinforced sheet and the non-reinforced sheet was examined under SEM to determine if the reinforcing macro-chip resulted in any apparent change in grain boundary precipitated by the addition of the second component to the powder blend.

Figure 1B:
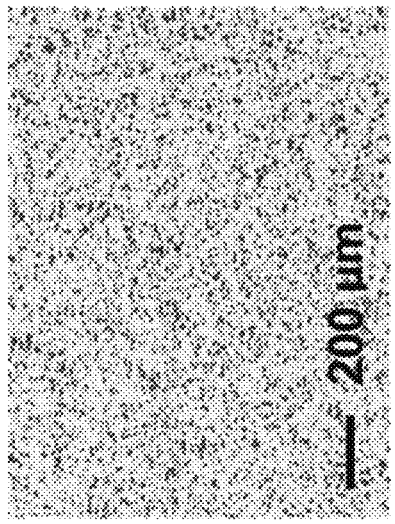
FIG. 1(b) is an SEM photomicrograph of a center of an extruded macro-chip reinforced alloy according to the present invention.
Figure 1C:
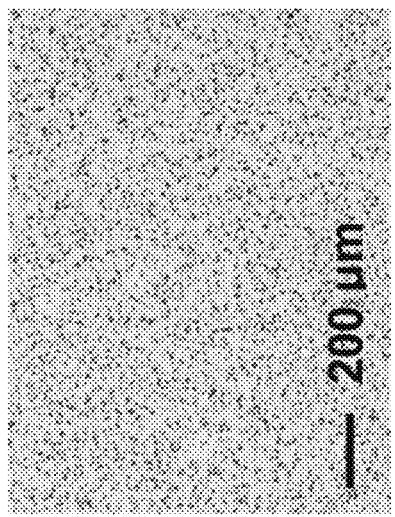
FIG. 1(c) is an SEM photomicrograph of a right side of an extruded macro-chip reinforced alloy according to the present invention.
Figure 2A:
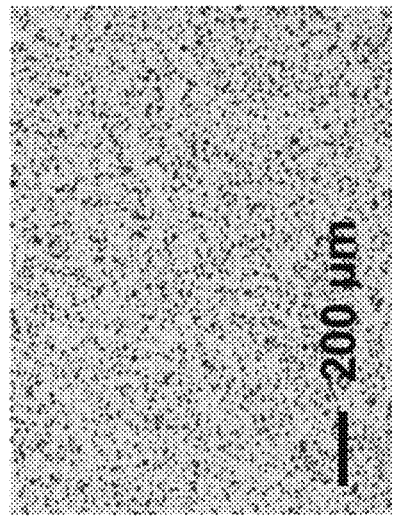
FIG. 2(a) is an SEM photomicrograph of a left side of an extruded non-reinforced alloy.
Figure 2B:
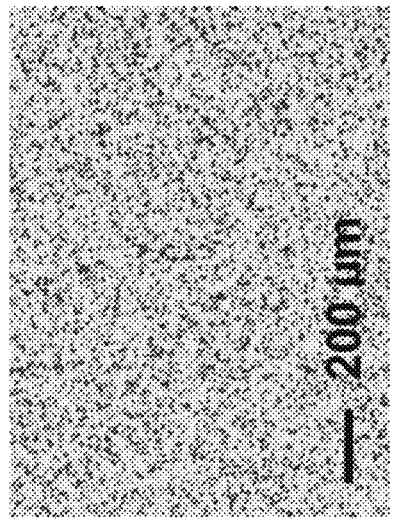
FIG. 2(b) is an SEM photomicrograph of a center of an extruded non-reinforced alloy.
Figure 2C:
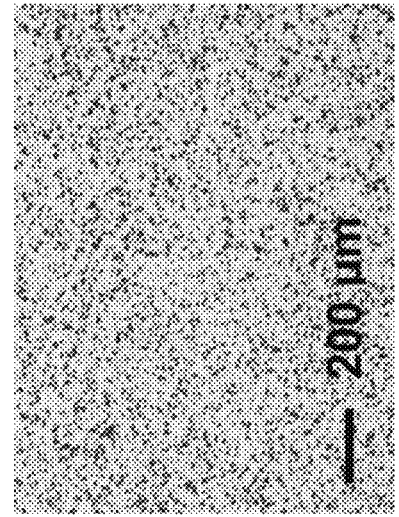
FIG. 2(c) is an SEM photomicrograph of a right side of an extruded non-reinforced alloy.

The observations of the reinforced sheet are shown in FIGS. 1(a)—i.e., left, 1(b)—i.e., center, and 1(c)—i.e., right. The observations of the non-reinforced sheet are shown in FIGS. 2(a)—i.e., left, 2(b)—i.e., center, and 2(c)—i.e., right. After observing both the reinforced sheet and the non-reinforced sheet, individual grains were not definitively observed.

Example 6

The reinforced sheet and non-reinforced sheet were then tested for neutron attenuation. The results are set forth in Table 6.

TABLE 6

|  | Nominal Area Density (mg B-10/cm2) | Thickness (cm) | B4C % |
| --- | --- | --- | --- |
| RS | 42.3 | 1.02 | 10.7 |
| NRS | 43.9 | 1.04 | 10.8 |

As demonstrated by Table 6, the results for areal density of Boron 10 and calculated boron carbide loading were as expected with no abnormality noted.

What is claimed is:

1. A powder blend comprising:
   a first component comprising a blend of a first metal particle and a first ceramic particle; and
   a second component comprising a reinforcing chip, the reinforcing chip comprising a second ceramic particle dispersed within a chip metal matrix;
   wherein the first ceramic particle and the first metal particle are present in a weight ratio ranging from about 1:15 to about 1:7.

2. The powder blend according to claim 1, wherein the first component and the second component are present in a weight ratio ranging from about 100:1 to about 2:1.

3. The powder blend according to claim 1, wherein the first ceramic particle and the second ceramic particle are formed from the same material.

4. The powder blend according to claim 1, wherein the first ceramic particle and the second ceramic particle are formed from different materials.

5. The powder blend according to claim 1, wherein the first ceramic particle and the second ceramic particle are each independently selected from the group consisting of alumina, titanium carbide, silicon carbide, tungsten carbide, boron carbide, and mixtures thereof.

6. The powder blend according to claim 1, wherein the first metal particle and the chip metal matrix are formed from the same material.

7. The powder blend according to claim 1, wherein the first metal particle and the chip metal matrix are formed from different materials.

8. The powder blend according to claim 1, wherein the first metal particle and the chip metal matrix are each independently selected from the group consisting of pure aluminum, an aluminum alloy, steel, a nickel alloy, a titanium alloy, and combinations thereof.

9. The powder blend according to claim 1, wherein the reinforcing chip has a height to width aspect ratio ranging from about 1:3 to about 1:1.25.

10. The powder blend according to claim 1, wherein the reinforcing chip has a height to thickness aspect ratio ranging from about 2:1 to about 10:1.

11. The powder blend according to claim 1, wherein the alloy chips have a width ranging from about 2.0 mm to about 10.0 mm.

12. The powder blend according to claim 1, wherein the alloy chips have a thickness ranging from about 0.1 mm to about 1.0 mm.

13. The powder blend according to claim 1, wherein the first ceramic particle and the second ceramic particle each have a particle distribution of 100% less than about 250 μm.

14. The powder blend according to claim 1, wherein the first metal particle has a d50 ranging from about 1 μm to about 20 μm.

15. The powder blend according to claim 1, wherein the first metal particle is an aluminum particle and has a natural oxide formation layer having a thickness ranging from about 3 nm to about 7 nm.

16. A powder blend comprising:
a first component comprising a blend of a first metal particle and a first ceramic particle; and
a second component comprising a reinforcing chip, the reinforcing chip comprising a second ceramic particle dispersed within a chip metal matrix;
wherein the first metal particle is an aluminum particle and has a natural oxide formation layer having a thickness ranging from about 3 nm to about 7 nm.

17. The powder blend according to claim 16, wherein the chip metal matrix is selected from the group consisting of pure aluminum, an aluminum alloy, steel, a nickel alloy, a titanium alloy, and combinations thereof.

18. The powder blend according to claim 16, wherein the first component and the second component are present in a weight ratio ranging from about 100:1 to about 2:1.

19. The powder blend according to claim 16, wherein the first ceramic particle and the second ceramic particle are each independently selected from the group consisting of alumina, titanium carbide, silicon carbide, tungsten carbide, boron carbide, and mixtures thereof.

20. The powder blend according to claim 16, wherein the first metal particle has a d50 ranging from about 1 μm to about 20 μm.

* * * * *